(12) United States Patent
Eek et al.

(10) Patent No.: US 12,375,563 B2
(45) Date of Patent: Jul. 29, 2025

(54) METHODS FOR INSTALLING APPARATUS AND SYSTEMS FOR MONITORING THE ENVIRONMENT IN AN INSULATING MATERIAL SURROUNDING PLANT EQUIPMENT AND/OR PIPE WORK

(71) Applicant: Indusenz AS, Trondheim (NO)

(72) Inventors: Ole Alexander Eek, Trondheim (NO); Evert Persson, Åmål (SE); Thomas Sperle, Ranheim (NO)

(73) Assignee: Indusenza AS, Trondheim (NO)

( * ) Notice: Subject to any disclaimer, the term of this patent is extended or adjusted under 35 U.S.C. 154(b) by 0 days.

(21) Appl. No.: 17/711,188

(22) Filed: Apr. 1, 2022

(65) Prior Publication Data

US 2022/0321657 A1    Oct. 6, 2022

(30) Foreign Application Priority Data

Apr. 1, 2021 (GB) ..................................... 2104775

(51) Int. Cl.
 *G06F 11/30* (2006.01)
 *G01M 99/00* (2011.01)
 *H04L 67/12* (2022.01)

(52) U.S. Cl.
 CPC ........... *H04L 67/12* (2013.01); *G01M 99/005* (2013.01)

(58) Field of Classification Search
 CPC ....................................................... H04L 67/12
 See application file for complete search history.

(56) References Cited

U.S. PATENT DOCUMENTS

| 2012/0056634 A1* | 3/2012 | Bohon | G01N 27/121 |
| | | | 324/700 |
| 2014/0305524 A1 | 10/2014 | Heizer et al. | |
| 2017/0045412 A1* | 2/2017 | Yunker | G01M 3/18 |

FOREIGN PATENT DOCUMENTS

| CN | 113344438 | 9/2016 |
| DE | 102015200638 | 7/2016 |
| JP | 2019132797 | 8/2018 |

(Continued)

OTHER PUBLICATIONS

Corrosion under Insulation (CUI) Detection, published by Research Disclosure on Jul. 16, 2018.

(Continued)

*Primary Examiner* — Phuong Huynh
(74) *Attorney, Agent, or Firm* — Ballard Spahr LLP (57) ABSTRACT

The invention provides a method of installing a sensor system in insulating material surrounding plant equipment and/or pipe work in a facility. The method comprises selecting a section of insulated plant equipment and/or pipework of the facility and installing a plurality of sensors in insulating material surrounding the plant equipment and/or pipe work in the section according to an installation plan. The plurality of sensors is installed by transmitting and/or receiving at least one unique identifier to and/or from each sensor of the plurality of sensors using an electronic apparatus and recording at least one installation property of each of the plurality of sensors using the unique identifiers. The method also comprises defining a group of installed sensors using the transmitted and/or received unique identifiers and associating the group of installed sensors with the section of insulated plant equipment and/or pipework.

18 Claims, 6 Drawing Sheets

(56) References Cited

FOREIGN PATENT DOCUMENTS

WO     WO-2021053121 A1 * 3/2021 ............. G01N 17/04

OTHER PUBLICATIONS

Extended European Search Report for European Application No. 22165218.3-1001, dated Jul. 15, 2022.
Examination Report for GB Application No. GB2104775.8, dated Sep. 28, 2021.
Search Report for GB Application No. GB2104775.8, dated Sep. 27, 2021.
Third Party Observations filed in GB Application No. GB2104775.8, Dec. 2, 2022.

* cited by examiner

METHODS FOR INSTALLING APPARATUS AND SYSTEMS FOR MONITORING THE ENVIRONMENT IN AN INSULATING MATERIAL SURROUNDING PLANT EQUIPMENT AND/OR PIPE WORK

CROSS-REFERENCE TO RELATED APPLICATION

This application claims priority to and the benefit of the filing date of United Kingdom Patent Application No. GB2104775.8, filed Apr. 1, 2021, which is incorporated herein by reference in its entirety.

FIELD

The present invention relates to methods for installing sensors and sensor systems for monitoring the environment in and around an insulating material surrounding plant equipment and/or pipe work. In particular, the present invention relates to methods for installing sensors and/or sensor systems in an insulating material surrounding plant equipment and/or pipe work. Aspects of the invention relate to a sensor for monitoring the environment in and around an insulating material surrounding plant equipment and/or pipe work.

BACKGROUND TO THE INVENTION

In industry, corrosion under insulation (CUI) is a problem that occurs in almost every industrial plant having insulated metal surfaces, including pipes, vessels and tanks. The insulation which encases these metal surfaces—which is commonly thermal, noise and/or fire insulation—is often surrounded by a layer of weatherproof cladding or casing. The insulation, together with the weatherproof cladding or casing, can act like a trap for water which is present in the insulating environment (which includes the insulating material and any air voids within the space beneath the weatherproof cladding or casing) to produce an environment in which corrosion can occur. Factors such as weather protection, the layout of the facility and the design of the facility, the insulation and/or the cladding can contribute to CUI risk.

Because the insulated surfaces are obscured, the extent of CUI, and environment for CUI, is often unknown. When corrosion occurs, corroded equipment or surfaces may have to be repaired or replaced. This can be expensive and disruptive and may result in extended downtime for parts of the plant. If severe corrosion is undetected for a period of time, this can lead to equipment failure or leaks, having potentially hazardous consequences. For example, a leak of high temperature fluid, toxic gases, high pressure gas or fluid and the consequent risk of ignition or explosion.

A way of monitoring the condition of insulated metal surfaces is to carry out routine manual inspection. This typically involves opening the surrounding cladding and insulation and is a resource intensive and demanding process which often requires the use of scaffolding for access purposes.

It is therefore desirable to provide an alternative to manual inspection for monitoring the environment in an insulating material surrounding plant equipment and/or pipe work.

Sensor systems comprising sensors which are installed in the insulating material that surrounds plant equipment and/or pipe work for monitoring the insulating environment have been proposed. However, installation of these sensors can be problematic. It can be difficult to carry out sensor installation where the layout of a facility includes insulated pipes and equipment in elevated and/or difficult to access areas. Even when an installer is able to gain access to plant equipment, it might not be possible to carry and operate the necessary equipment due to spatial or layout constraints. Installation of a sensor system can therefore be a time consuming, resource intensive and risky process.

Where high numbers of sensors are required—for example, due to the size and/or configuration of a plant, the risk for CUI and/or chosen sensor quantities and layout—it can be time consuming, expensive, and labour intensive to accurately integrate the details of each sensor into the facility information. This process relies heavily on the installer working to precise specifications and taking accurate records throughout the sensor installation process. However, these details are required to meaningfully link the data obtained from each sensor to the CUI risk of an insulated surface and to identify the location, or locations, at which the CUI risk is higher.

SUMMARY OF THE INVENTION

It is amongst the aims and objects of the invention to provide methods for installing apparatus and systems for monitoring external properties of plant equipment and/or pipe work which address one or more of the problems identified above.

It is amongst the aims and objects of the invention to provide methods for installing a sensor and/or a sensor system in an insulating material surrounding plant equipment and/or pipe work which improves the speed and ease of sensor and/or sensor system installation and which reduces the equipment required for the installation procedure.

An object of the invention is to provide methods for integrating sensor system details into the facility information which addresses one or more of the problems identified above.

An object of the invention is to provide methods for integrating sensor system details into the facility information which provide reliable information relating to sensor placement and which reduce the time and resources required to update the facility information. Further objects and aims of the invention will become apparent from the following description.

According to a first aspect of the invention there is provided a method of installing a sensor system in insulating material surrounding plant equipment and/or pipe work in a facility, the method comprising:
  selecting a section of insulated plant equipment and/or pipework of the facility;
  installing a plurality of sensors in insulating material surrounding the plant equipment and/or pipe work in the section according to an installation plan;
  wherein installing the plurality of sensors comprises:
    using an electronic apparatus, transmitting and/or receiving at least one unique identifier to and/or from each sensor of the plurality of sensors and recording at least one installation property of each of the plurality of sensors using the unique identifiers; and defining a group of installed sensors using the transmitted and/or received unique identifiers, and associating the group of installed sensors with the section of insulated plant equipment and/or pipework.

The at least one installation property may be an installation sequence of the plurality of sensors using the unique identifiers and the method may comprise recording an installation sequence of each of the plurality of sensors using the unique identifiers.

The at least one installation property may be an approximate location of each of the plurality of sensors using the unique identifiers.

The approximate location of each sensor of the plurality of sensors may be determined using a GPS enabled device.

The approximate location of each sensor of the plurality of sensors may be an approximate location with respect to the plant equipment and/or plant work. For example, the method may comprise recording the approximate location of each of the plurality of sensors using the unique identifiers by associating each unique identifier (electronically or otherwise) with a location on the plant equipment and/or plant work. More specifically, associating each unique identifier (electronically or otherwise) with a location on a drawing and/or a model of the plant equipment and/or plant work.

The section of insulated plant equipment and/or pipework may be a sub-section of a larger section. Where the at least one installation property is an installation sequence of each of the plurality of sensors, using the unique identifiers, the installation sequence may therefore be an installation sequence for the sub-section. The sub-section may be a sub-section of the insulated plant equipment and/or pipework in which a single installer will or has worked to install the sensors. The sub-section may be a continuous section.

As a consequence, where the section of insulated plant equipment and/or pipework is a sub-section (i.e. part of a larger section), the group of installed sensors may be a sub-group (i.e. part of a larger group).

A larger section may comprise multiple sub-sections. Sensors within each of the multiple sub-sections may therefore be installed by various installers, which may be done simultaneously, and/or by a single installer at different times. The single installer may choose or may be instructed to install sensors in sub-sections, where different sub-sections of the plant equipment and/or pipe work have different access requirements, locations, features and/or characteristics.

The method may comprise storing and/or outputting installation data comprising the unique identifiers, the at least one installation property, and the installation plan.

The method may comprise using the installation data to derive location information for an individual sensor of the group of sensors. The method may comprise deriving location information for multiple sensors of the group of sensors from the installation data. The method may comprise deriving a map of sensor locations for some or all of the sensors of the group of sensors.

Alternatively, or in addition, the installation data may be used at a later time to derive location information for one or more sensors of the group of sensors. The later time may be when the sensor system is operational. The step of deriving location information for the one or more sensors may only be carried out if and when this information is required. For example, if one or more of the sensors of the group of sensors take readings which are linked to a high risk for CUI at one or more locations in the section, the facility operator may use the installation data to determine the location of the specific sensors to locate the high-risk area or areas in the section.

The installation data is useful because it can be used to derive all of the necessary information about the sensor system. However, it does not necessarily need to be used in this way unless the information is required. By associating the group of sensors with the section of insulated plant equipment and/or pipework, the process of integrating the details of the sensor system into the facility information is streamlined. Instead of recording the details of every individual sensor in the facility information, the group association with a known section is all that is required, as this provides the ability to determine specific information relating to one or more individual sensors if it is required.

The section of insulated plant equipment and/or pipework may be a continuous section. Alternatively, the section may be a section formed from a plurality of sub-sections of insulated plant equipment and/or pipework. The selection of the section may be based on plant equipment and/or pipework properties or factors such as CUI risk.

The method may comprise defining the installation plan. Alternatively, the installation plan may be a pre-determined plan.

The installation plan may be based on one or more characteristics of the section of insulated plant equipment and/or pipework selected from the group comprising: the CUI risk factor for the section; the physical layout of the section; the presence and location of equipment and/or pipework components (such as valve blocks) in the section; the location of the section with respect to the wider facility; ease of access of the section; and/or properties of the plant equipment and/or pipework over which the section spans (such as age, use and/or material, amongst other factors).

The installation plan may comprise one or more rules or criteria.

The installation plan may comprise a rule to install each of the plurality of sensors at predetermined distance intervals (for example, installing a sensor every 2 metres) which may be defined between two reference points. The two reference points may comprise start and end points of the section. Alternatively, or in addition, the two reference points may comprise one or more intermediate reference points in the section. Alternatively, or in addition, the predetermined distance intervals may be distance intervals set from the location of another sensor.

The predetermined distance intervals, and therefore the concentration of sensors throughout the section, may be uniform.

The predetermined distance intervals, and therefore the concentration of sensors throughout the section, may not be uniform.

The sensor installation plan may comprise a rule to install one or more sensors of the plurality of sensors at a selected circumferential position around the insulating material, where the insulated plant equipment and/or pipework is a cylindrical component such as a pipe.

The one or more rules or criteria may not be uniform for or apply to the entire section.

The electronic apparatus may be a handheld device.

The unique identifier may be optically readable. The electronic apparatus may be an optical scanning device, or any device configured to read an optically readable unique identifier.

The unique identifier may be a barcode. More specifically, the unique identifier may be a QR code.

The sensor may comprise an electronic display and the unique identifier may be presented by the display. The display may comprise one or more LEDs.

The unique identifier may be an RFID tag. The RFID tag may be active or passive. The RFID tag may be readable and/or writeable. The electronic apparatus may be an RFID reader and/or writer device, or any device configured to read and/or write to an RFID tag.

The unique identifier may be an acoustic signal. The electronic apparatus may be any device configured to receive and/or transmit an acoustic signal.

The unique identifier may be a radio frequency (RF) signal.

The method may comprise wirelessly transmitting and/or receiving at least one unique identifier to and/or from each sensor of the plurality of sensors.

Each sensor of the plurality of sensors may comprise an activation means which is operable to allow the sensor to transmit and/or receive at least one unique identifier to and/or from the electronic apparatus.

The activation means may be a manually actuated activation means (such as a button or a switch). The activation means may be a magnetically actuated activation means. The activation means may be an inductively actuated activation means. The activation means may be an electronically actuated activation means. The activation means may be actuated by a signal. The signal may be a radio frequency (RF) signal.

Each sensor of the plurality of sensors may be installed on the section of insulated plant equipment by applying a pushing force to the sensor to push a sensor probe of the sensor into a hole formed in cladding surrounding the insulating material.

One or more sensors of the plurality of sensors may be a sensor according to any of the fifth or sixth aspects of the invention. One or more sensors of the plurality of sensors may be a sensor assembly comprising a sensor probe and a sensor seal element arranged around the sensor probe as described with reference to the third aspect of the invention.

One or more sensors of the plurality of sensors may comprise a fastening element. The fastening element may comprise one or more surfaces or protrusions which are configured to index a corresponding depression and/or be inserted into or through a constriction. The fastening element may be annular and may be provided around a probe of each sensor. The fastening element may be a snap-fit element or a plurality of snap fit elements. The snap-fit element or elements may be formed from a resilient material. The snap-fit element may have a dimension which is greater than that of a hole formed in cladding surrounding the insulating material. Alternatively, the snap-fit elements together may define a dimension which is greater than that of a hole formed in cladding surrounding the insulating material.

The snap-fit element or elements may be configured to be deformed and/or displaced, on application of a force, to allow it or them to be passed through the hole in the cladding.

The snap-fit element or elements may be configured to return to it or their original shape, size and/or position when application of the force ceases, such that it secures the sensor in place.

The snap-fit element may be annular. The snap-fit element may have a diameter which is greater than the diameter of the hole. The snap-fit element may be configured to be reduced in diameter on application of a force, to allow it to be passed through the hole in the cladding. The snap-fit element may be a snap-fit ring mounted around a probe of each sensor.

Installing the plurality of sensors may comprise one or more of the installation methods according to the third or fourth aspects of the invention.

According to a second aspect of the invention there is provided a method of installing a sensor system in insulating material surrounding plant equipment and/or pipe work in a facility, the method comprising:
  selecting a section of insulated plant equipment and/or pipework of the facility;
  installing a plurality of sensors in insulating material surrounding the plant equipment and/or pipe work in the section according to an installation plan;
  wherein installing the plurality of sensors comprises:
    using an electronic apparatus, transmitting and/or receiving at least one unique identifier to and/or from each sensor of the plurality of sensors and recording an installation sequence of each of the plurality of sensors using the unique identifiers; and defining a group of installed sensors using the transmitted and/or received unique identifiers, and associating the group of installed sensors with the section of insulated plant equipment and/or pipework.

Embodiments of the second aspect of the invention may include one or more features of the first aspect of the invention or its embodiments, or vice versa.

According to a third aspect of the invention there is provided a method of installing a sensor in an insulating material surrounding plant equipment and/or pipe work, the method comprising:
  providing a sensor for detecting the presence of water in an insulating material, the sensor comprising a sensor probe;
  locating an end of the sensor probe with respect to a hole in cladding surrounding the insulating material; and
  applying a pushing force to the sensor to push the sensor probe into the hole, causing a seal to be formed between the sensor and the hole.

This method is particularly advantageous because it is a simple self-sealing solution. No additional equipment is required to install the sensor (although it could be used as part of the installation process). Instead, the exertion of a simple push-fit motion results in a secure and sealed connection between the sensor and the cladding surrounding the insulating material. The simplicity of the method enables the use of autonomous and semi-autonomous installation systems to perform sensor installation. A sealed connection is important in this particular application, because otherwise the hole could provide an ingress point for water to gain entry into the insulating environment, increasing the risk for CUI in the system.

The sensor may be a sensor for detecting one or more additional properties, including (but not limited to) humidity, temperature, salinity and/or PH.

The method may comprise forming the hole in the cladding. The method may comprise forming a hole in the insulating material.

The plant equipment and/or pipe work may comprise any metal surface covered by insulation and may be any one or more pieces of plant equipment and/or pipe work selected from the group comprising: pipes, pipe fittings, tubulars, vessels, tanks ducts, distillation columns, reactors, flanges, welds.

The direction of the pushing force may be substantially perpendicular to an external surface of the cladding at the location of the hole.

The sensor probe may be substantially cylindrical. The sensor probe may comprise a rounded or a pointed end, which may make it easier for the sensor to penetrate and/or pierce the insulating material during installation.

The sensor may comprise a sensor assembly comprising the sensor probe and a sensor seal element arranged around the sensor probe. An outer surface of the sensor probe may comprise a recess or groove to accommodate the sensor seal.

The method may comprise locating an end of the sensor assembly with respect to a hole in cladding surrounding the insulating material.

The method may comprise applying a pushing force to the sensor assembly to push the sensor probe and a portion of the sensor seal element into the hole, causing the sensor probe to be moved with respect to the sensor seal element into an engaged position with the sensor seal element, and causing the sensor seal element to deform and form a seal with the hole.

The sensor seal element may be concentric with the sensor probe. The sensor probe may be axially moveable with respect to the sensor seal element.

The application of the pushing force may effect axial movement of the sensor probe with respect to the sensor seal element.

The sensor seal element may be formed from a flexible material or materials. The sensor seal element material or materials may be elastomeric, deformable, compressible and/or resilient. The sensor seal element may be formed from a natural material or materials. The sensor seal element may be formed from a synthetic material or materials. The sensor seal element may be formed from a polymer. The sensor seal element may be formed from any one or more of the following materials: rubber, silicone, polyurethane and/or Ethylene Propylene Diene Monomer (EPDM), which may be used in combination with any one or more other materials.

The application of the pushing force may cause an outer diameter of the sensor seal element to expand inside the cladding to secure the sensor in place.

The sensor assembly, the sensor probe and the sensor seal elements may have first and second ends. The first end or end region of the sensor assembly, the sensor probe and the sensor seal element is the end (or ends) which are configured to be located closest to the insulated surface, in use, and the second end or end region of the sensor assembly, the sensor probe and the sensor seal element is the opposite end (or ends) which are configured to be located farthest from the insulated surface, in use. When a sensor assembly is installed vertically on top of a piece of insulated plant equipment or pipework, the first and second ends or end regions of the sensor assembly and its parts will therefore generally correspond to top and bottom ends or end regions, respectively. The opposite will apply where a sensor is installed vertically on the bottom of insulated plant equipment or pipework (i.e. at a 6 o'clock position on a pipe).

The sensor seal element preferably comprises an internal bore through which the sensor probe can be moved.

The inner diameter of the bore of the sensor seal element may be sized to accommodate the outer diameter of the sensor probe in at least one location. The inner diameter of the bore of the sensor seal element may be smaller than the outer diameter of the sensor probe in at least one location. In this way, movement of the sensor probe through the sensor seal element may cause the outer diameter of the sensor seal element to expand when the sensor probe is moved through the section of the sensor probe bore having an inner diameter smaller than the outer diameter of the probe.

A first end portion of the sensor seal element may be located with respect to the hole, before application of the pushing force. The first end portion of the sensor seal element may be pushed into the hole upon application of the pushing force. The first end portion may comprise a restriction in the bore having an inner diameter which is less than the outer diameter of the sensor probe. Therefore, when the sensor probe is moved through the bore of the sensor seal element upon application of the pushing force, the sensor probe contacts and acts upon the reduced inner diameter portion of the sensor seal element to deform it and increase its inner diameter to accommodate the probe. In doing so, the outer diameter of the sensor seal element is caused to expand radially outwards. The inner bore of the sensor seal element may comprise a conical cross section, with the inner diameter being tapered from a minimum diameter at its first end to a maximum diameter at its second end.

The internal bore of the sensor seal element may comprise one or more projections or ridges which restrict its inner diameter to a value less than the outer diameter of the sensor probe.

The method may comprise effecting axial movement of only part of the sensor seal element and/or only part of the sensor probe through the hole, to a position beneath the cladding.

Movement of the sensor seal element and the sensor probe through the hole may compress the sensor seal element between the hole and the sensor probe to form a seal between these elements.

The sensor seal element may comprise a shoulder portion which may have a diameter which is greater than the hole and which may be configured to abut the external surface of the cladding following installation of the sensor.

The method may comprise sealing the hole with the shoulder portion of the sensor seal element, to form a seal outside of the cladding.

The sensor may comprise an external body portion which may be rigidly attached to the probe and which may be configured to remain outside of the cladding following installation of the sensor. The external body portion of the sensor may abut the shoulder portion of the sensor seal element of the sensor following installation of the sensor. The shoulder portion of the seal element may be located between an external surface of the cladding and a surface of the external body portion and may be compressed between these two elements following installation of the sensor. Compression of the shoulder portion causes the sensor seal element to form a seal with the hole in the cladding.

An external surface of the sensor probe and/or an internal surface of the sensor seal element may comprise one or more projections and/or grooves.

An outer surface of the probe and/or an internal surface of the sensor seal element may comprise one or more rifles. The rifles may be helical rifles. The provision of rifles on one or both of these surfaces advantageously improves the ease of installation and removal of the sensor and improves the hold between the sensor probe and the sensor seal element in the inserted position, as a rotational force is provided by the rifles in addition to the pushing/pulling force applied to the sensor during installation/removal.

An external surface of the sensor probe and/or an internal surface of the sensor seal element may comprise a textured surface and/or a section of material which is configured to increase the frictional force between the two surfaces.

Providing a means for increasing the friction and/or the grip between the external surface of the sensor probe and the internal surface of the sensor seal element—which slidably contact one another when the sensor probe is axially moved within the seal element—is advantageous because it results in a secure and reliable connection between the cladding and the sensor. The cooperation between the sensor probe and seal element after the sensor probe has been inserted into the seal element is what results in the sealed and secure connection between the sensor and the cladding. Therefore, improving the grip between the probe and the seal element helps to retain these components in the desired sealed and secured position.

The sensor may comprise a fastening element. The fastening element may be a snap-fit element or a plurality of snap fit elements, wherein a snap-fit element is a fastening element which comprises one or more surfaces or protrusions which are configured to index a corresponding depression and/or be inserted into or through a constriction.

The snap-fit element or elements may be formed from a resilient material. The snap-fit element may have a dimension which is greater than that of a hole formed in cladding surrounding the insulating material. Alternatively, the snap-fit elements together may define a dimension which is greater than that of a hole formed in cladding surrounding the insulating material.

The snap-fit element or elements may be configured to be deformed and/or displaced, on application of a force, to allow it or them to be passed through the hole in the cladding.

The snap-fit element or elements may be configured to return to it or their original shape, size and/or position when application of the force ceases, such that it secures the sensor in place.

The snap-fit element may be annular. The snap-fit element may have a diameter which is greater than the diameter of the hole. The snap-fit element may be configured to be reduced in diameter on application of a force, to allow it to be passed through the hole in the cladding. The snap-fit element may be a snap-fit ring mounted around a probe of each sensor.

The method may comprise providing an annular gasket around the hole in the cladding.

The method may comprise applying a pushing force to the sensor to push the sensor probe into the hole and the snap-fit element or elements through the hole. When pushed through the hole in the cladding, the snap-fit element or elements holds the sensor in place.

Where the sensor comprises an external body portion, the external body portion of the sensor may abut the annular gasket following installation of the sensor. The annular gasket may be compressed between an external surface of the cladding and a surface of the external body portion following installation of the sensor. Compression of the annular gasket causes a seal to be formed between the sensor and the hole.

The sensor may be retrievable. The sensor installation method may be reversible.

Embodiments of the third aspect of the invention may include one or more features of the first and/or second aspects of the invention or their embodiments, or vice versa.

According to a fourth aspect of the invention there is provided a method of installing a sensor in an insulating material surrounding plant equipment and/or pipe work, the method comprising:
  providing a sensor assembly for detecting the presence of water in an insulating material, the sensor assembly comprising a sensor probe and a sensor seal element arranged around the sensor probe;
  locating an end of the sensor assembly with respect to a hole in cladding surrounding the insulating material; and
  applying a pushing force to the sensor assembly to push the sensor probe and a portion of the sensor seal element into the hole, causing the sensor probe to be moved with respect to the sensor seal element into an engaged position with the sensor seal element, and causing the sensor seal element to deform and form a seal with the hole.

Embodiments of the fourth aspect of the invention may include one or more features of the first to third aspects of the invention or their embodiments, or vice versa.

According to a fifth aspect of the invention there is provided a sensor for detecting the presence of water in an insulating material surrounding plant equipment and/or pipe work, the sensor comprising a sensor probe and a fixing element;
  wherein the fixing element is configured to have a diameter which is greater than a diameter of a hole in cladding surrounding the insulating material; and
  wherein the fixing element is configured to be reduced in diameter on application of a force, to allow it to be passed through a hole in the cladding to secure the sensor to the cladding.

The fixing element may be a snap-fit element or elements. The snap-fit element or elements may be formed from a resilient material. The snap-fit element or elements may be configured to return to it or their original shape and size when application of the force ceases, such that it secures the sensor assembly in place against the cladding. The snap-fit element may be a snap-fit ring mounted around the probe of the sensor.

Embodiments of the fifth aspect of the invention may include one or more features of the first to fourth aspects of the invention or their embodiments, or vice versa.

According to a sixth aspect of the invention there is provided a sensor assembly for detecting the presence of water in an insulating material surrounding plant equipment and/or pipe work, the sensor assembly comprising:
  a sensor probe; and
  a sensor seal element;
  wherein the sensor seal element is arranged around the sensor probe;
  wherein the sensor probe is axially moveable with respect to the sensor seal element; and
  wherein axial movement of the sensor probe within the sensor seal element is configured to cause an external diameter of the sensor seal element to expand.

Embodiments of the sixth aspect of the invention may include one or more features of the first to fifth aspects of the invention or their embodiments, or vice versa.

According to a seventh aspect of the invention there is provided a method of manufacturing a sensor seal element for a sensor using 3D printing techniques.

Embodiments of the seventh aspect of the invention may include one or more features of the first to sixth aspects of the invention or their embodiments, or vice versa.

According to a eighth aspect of the invention there is provided a method for associating the details of a sensor system with a facility, the method comprising:
  obtaining an installation sequence of unique identifiers for a plurality of sensors installed in a section of insulated plant equipment and/or pipework of the facility, wherein each of the plurality of sensors has a unique identifier; and
  defining a group of installed sensors using the unique identifiers, and associating the group of installed sensors with the section of insulated plant equipment and/or pipework Embodiments of the eighth aspect of the invention may include one or more features of the first to seventh aspects of the invention or their embodiments, or vice versa.

According to an ninth aspect of the invention there is provided a method for installing a sensor system in insulating material surrounding a section of insulated plant equipment and/or pipework, the method comprising:

using an electronic apparatus, transmitting and/or receiving at least one unique identifier to and/or from each sensor of the plurality of sensors; and     recording an installation sequence of each of the plurality of sensors using the unique identifiers.

Embodiments of the ninth aspect of the invention may include one or more features of the first to eighth aspects of the invention or their embodiments, or vice versa.

According to a tenth aspect of the invention there is provided a method of determining the location of one or more sensors in a sensor system, the method comprising:

accessing installation data relating to a sensor system, wherein the installation data comprises:

unique identifiers for a plurality of sensors, each sensor of the plurality of sensors having a unique identifier;

the installation sequence of each of the plurality of sensors using the unique identifiers; and         the installation plan for the plurality of sensors; and     using installation data relating to the sensor system to derive location information for the one or more sensors.

The method may comprise using the installation data to calculate the location of the one or more sensors.

The method may comprise forming a map of the one or more sensors in a sensor system.

The method may comprise accessing the installation data in a database.

Embodiments of the tenth aspect of the invention may include one or more features of the first to ninth aspects of the invention or their embodiments, or vice versa.

BRIEF DESCRIPTION OF THE DRAWINGS

There will now be described, by way of example only, various embodiments of the invention with reference to the drawings, of which.

DETAILED DESCRIPTION OF PREFERRED EMBODIMENTS

Figure 1:
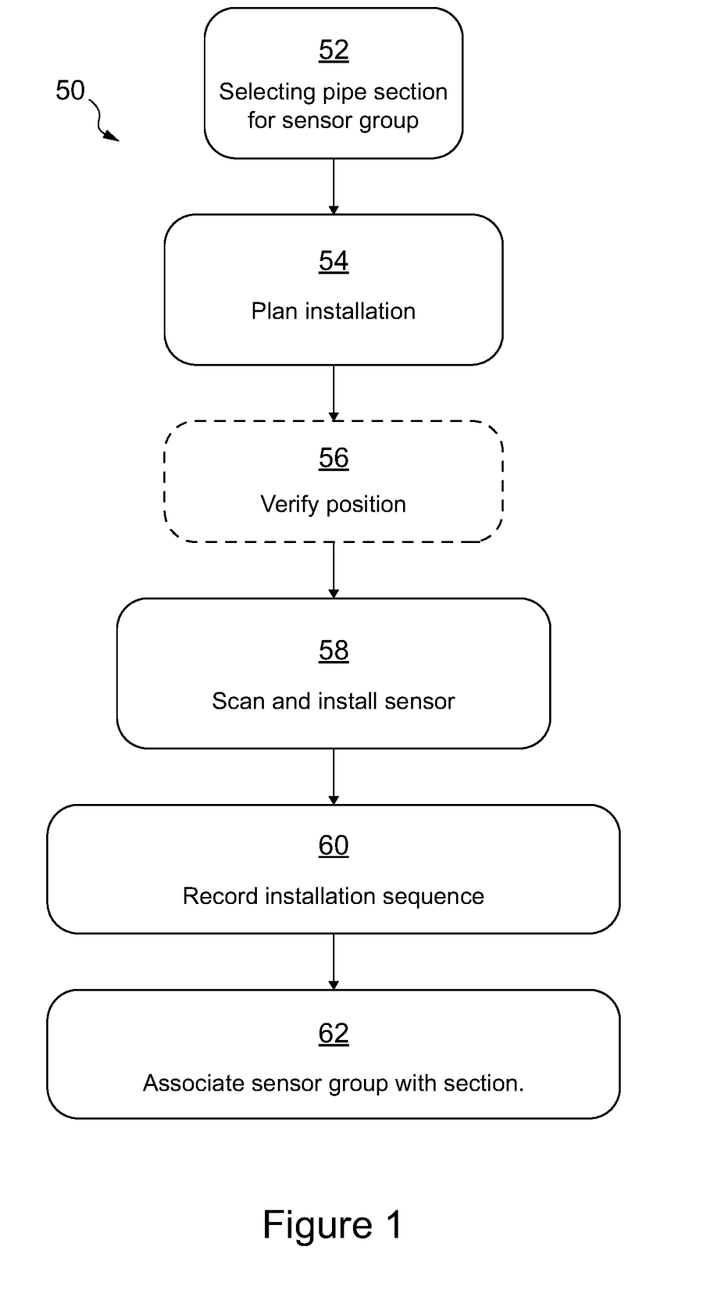
FIG. 1 is a schematic representation of a method of integrating the details of a sensor system into an operator's facility information.

Referring firstly to FIG. 1, there is provided a schematic representation of a method of integrating the details of a sensor system into an operator's facility information. The facility information can include, amongst other things, drawings (including isometric drawings and process and instrument diagrams), models and a digital twin.

When deciding whether to deploy a sensor system for monitoring the properties of the insulating environment surrounding insulated plant equipment and/or pipe work, a facility operator will consider the work which will be required to integrate the sensor system information into the facility information. Conventionally, this would be done by tagging every sensor with a tag number, having the installer install a specific sensor (identified by its tag number) at a specific location, logging the exact location of each sensor and updating the facility information to show the location of each specific sensor and its tag number. The precise location of every sensor needs to be known, because this information is important when the sensors begin to generate readings to accurately analyse the sensor data in the manner required. For example, the known location of the one or more sensors can be used to pin-point a water ingress point to the insulating environment.

This method is not practical because it is time consuming and it relies too heavily on the installer to install the correct sensor at the correct location. If the wrong sensor is installed, the facility information will be incorrect. The error may go undetected, impacting the sensor system analysis. Furthermore, updating the facility information to include reference details for each sensor (including its unique tag number and location) is a disruptive, time consuming and expensive task. These reasons may dissuade a facility operator from installing a sensor system, particularly if a high number of sensors are required (for example, some sensor systems can, for example, comprise up to 500,000 sensors). However, it will be appreciated that the method which is described can be used in relation to any number of sensors, with the same associated benefits.

The method presented by FIG. 1 is an alternative method of incorporating data relating to a new sensor system into existing facility information, which aims to address the drawbacks of the conventional methods described above. The method, generally shown at 50, involves grouping sensors within the sensor system and associating the groups of sensors with the insulated plant equipment and/or pipe work. For example, a group of sensors may be allocated to a particular section of plant equipment and/or pipe work or to certain areas of the plant equipment and/or pipe work which have been deemed to be high risk.

In this example, a section of an insulated pipe is selected to have a group of sensors installed on it and the method begins by identifying the section of pipe on which the sensors within the sensor group will be installed 52, including its start and end points.

In alternative implementations of the method, the section can be a sub-section in a larger section or area, on to which a sub-group on sensors is installed. Multiple sub-sections, each with their own installation plan (described below), may be grouped to form a larger section and/or group. Where there are multiple sub-sections, installation of the sensor groups (or sub-groups) can be performed simultaneously by different installers, or at different points in time by the same installer (or a combination of both approaches can be followed).

For the selected section of pipe, a sensor installation plan 54 is formed. The sensor installation plan may be, in a simple form, the determination of distance intervals between sensors (for example, the plan may be to install a sensor at distance intervals of two meters on the pipe section). An alternative form of simple installation plan is to implement a rule to install sensors in holes which have been pre-formed in cladding surrounding the insulating material. In a more complex form, the plan can account for design considerations of the pipe which can include (but are not limited to): the orientation of the section (including bends, branches, vertical, horizontal and/or inclined sections), the presence of obstructions on the section (for example, a valve block) and their location and/or the CUI risk associated with the section, or parts of the section, in question. As such, the installation plan can include additional details, such as the position of sensors around the section of pipe. In some cases, the number of sensors required for a section may also be calculated or estimated during development of the installation plan. It will be appreciated that the installation plan may not be uniform for the entire section.

At this point, or at any other time during the method, the facility operator may choose to perform a site survey, which could be useful to verify the conclusions reached and/or assumptions made during the planning phase of the sensor system and the proposed positions of the sensors 56. GPS and/or a specialist computer location application (loaded, for example, on a tablet) could be used to perform this task.

The sensors are then installed on the section of pipe according to the plan 58. The installer is aware of the start and end points of the section. In addition, there may be intermediate reference points in the section which can help the installer to verify that the sensors are being installed correctly, per the installation plan and/or to calibrate sensor placement. The intermediate reference points may be in the form of recognisable characteristics such as valve blocks and bends. Reference points can be particularly useful where the section in question spans a large area or distance, where the distance intervals between sensors could begin to creep due to errors in sensor placement knocking-on to the remaining sensors in the section.

The installer will have access to a container holding multiple sensors, and each sensor will comprise a means for identifying it. For example, each sensor could have a sticker displaying a unique optically readable tag. This could be a unique bar code (for example, a QR code) which is scanned by the installer immediately before, during or after its installation. Alternative sensor identification techniques and technologies could be used and, similarly, any known scanning technology can be used for this task. In another example, each sensor can be provided with a radio-frequency identification (RFID) tag which is scanned, as appropriate, by the installer during sensor installation.

Instead of receiving a unique identifier from a sensor, a unique identifier may be transmitted to a sensor to assign the sensor with a unique identity. This can be done in a variety of ways which involve communicating with the sensor (for example, with the memory of the sensor, or with a writeable sensor RFID tag) to transmit a unique sensor identity to the sensor. Where the sensor has a memory, this is preferably a non-volatile memory. Network protocols could be used to communicate with sensor memory (for example, using a handheld device such as a smartphone or a tablet) to assign the unique identity in this way. Appropriate network protocols include, but are not limited to, LoRaWAN, Wi-Fi, cellular (for example, 4G or 5G), Zigbee and/or Bluetooth. Indirect methods of communicating with the sensor memory may also be used, for example those involving the use of a Gateway.

In some embodiments of the invention, the method can include the installer reading a unique identifier on a sensor and manually recording this identifier.

The sensors can optionally be provided with an activation means to allow them to transmit and/or receive a unique identifier. The activation means can be manually, electronically, inductively, or magnetically actuated. Alternatively, the activation means could be touch actuated (for example, by recognition of a touch pattern and/or sequence) and may comprise one or more motion and/or vibration sensors. Another alternative activation means could be actuated upon recognition of a different type pattern (including sound, light and/or temperature patterns). Alternatively, actuation could be effected by a change in one or more external properties and/or by one or more properties reaching a threshold value (for example, temperature or humidity).

Advantageously, the installer is able to select any sensor from the container to install as he or she executes the installation plan, instead of having to carefully select a specific sensor (sought out by a unique tag number) and install the unique sensor at a specific position.

By scanning the sensors as they are installed, the installation sequence of the sensor group on the section is recorded 60.

The method may optionally comprise the step of programming one or more sensors as they are installed, to provide certain sensors with specific operating instructions. For example, if a sensor is being installed at a location that is deemed to be higher risk for CUI (i.e. at a pipe bend at the bottom of a vertical drop where water would be expected to gather), that particular sensor may be instructed to take readings at more regular intervals than the rest of the sensors in the system. Other information and/or instructions may be conveyed to the sensors in this way. This may be done by transmitting/writing data to the sensor as described above.

Upon completion of the installation, a log will have been produced which associates the group of sensors which have been installed with the specific section of pipe 62.

It will be appreciated that, alternatively, a nominal group could be assigned to a specific section before any sensors are installed (i.e. between steps 52 and 58). As such, the group will initially be empty. As sensors are installed, they are added to the group and the association of the group of physical sensors with the pipe section is formed in this way.

This sensor mapping method 50 improves the ease of incorporating a sensor system into the facility information, whilst still offering a means of gathering and storing all of the necessary and relevant data for further sensor system analysis. Instead of updating the facility information to include details of the precise location and the unique identity of each individual sensor—making this material crowded and overwhelming—the facility information can instead be updated to simply show the location of a section and its associated sensor group. This reduces the amount of work that is required to incorporate the sensor system information into the facility information.

The data record for the sensor group obtained throughout the installation process—including the installation sequence for the group and details relating to the location and dimensions of the section—is stored (for example, in a database) and can be used to calculate or estimate the exact location of each sensor within the group. As such, the facility operator is provided with all of the information, if required, to analyse the sensor system readings.

The method described above can be further improved by utilising sensors for the sensor system which are quick and simple to install. Example of such sensors are shown in FIGS. 2A, 2B, 7A and 7B.

Figure 2A:
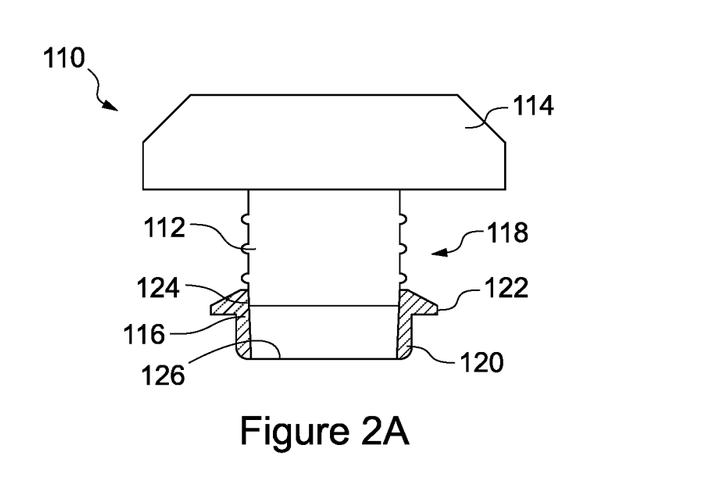
FIG. 2A is a part-sectional side view of a sensor according to an embodiment of the invention.
Figure 2B:
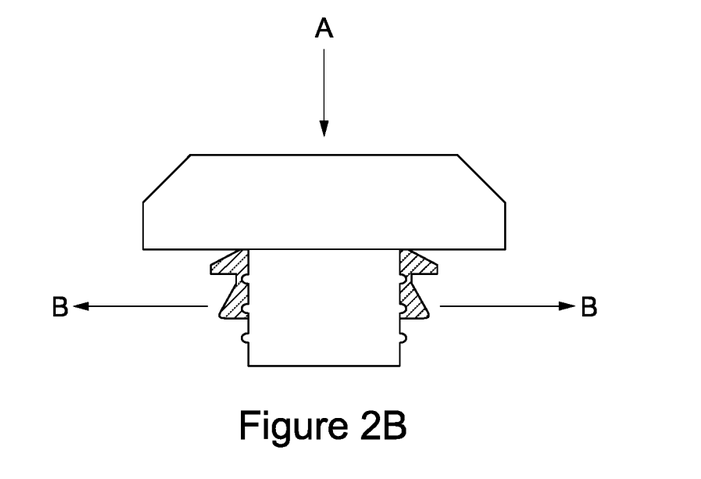
FIG. 2B is a part-sectional side view of the sensor of FIG. 2A in an installed position.

FIGS. 2A and 2B show, generally at 110, a sensor assembly according to an embodiment of the invention for detecting the presence of water in an insulating material which can be utilised in the method described with reference to FIG. 1.

The sensor assembly 110 comprises a sensor probe 112 rigidly coupled to an external sensor body 114. The sensor probe 112 is configured to be inserted into insulating material underneath a weatherproof cladding and, in this way, exposed to the insulating environment for taking readings. The external sensor body 114 is designed to remain outside of the insulating environment and, in practice, will project outwardly from the weatherproof cladding surrounding the insulating material. The external sensor body 114 can be used to house sensor parts and electronics.

The sensor assembly 110 also comprises a sensor seal element 116 which is concentrically mounted around the sensor probe 112. In the initial position shown in FIG. 2A, the sensor probe 112 is axially slidable within the sensor seal element 116. However, the sensor probe comprises rifles (recesses and ridges, which may be helical), shown generally at 118, which help to produce a frictional force between the sensor probe 112 and the sensor seal element 116 when the sensor probe 112 is pushed into the sensor seal element (as will be described below in more detail).

The sensor seal element 116 has a substantially cylindrical body portion 120, a first end 126 which is configured to extend through a hole formed in the weatherproof cladding surrounding the insulating material, and a shoulder portion 122 at its second end 124, which is configured to be seated on an outer surface of the cladding. In use, both the body portion 120 and the shoulder portion 122 will act to retain the sensor assembly 110 in place in the insulating material and both parts can also function to form a seal with the insulating material/and or the cladding.

The sensor seal element 116 has a tapered, conical inner profile, with the inner diameter at its second end 124 being greater than the inner diameter at its first end 126. At its second end 124, the inner diameter of the sensor seal element 116 is sufficiently sized to fit around the external circumference of the sensor probe 112. At its first end 126, the inner diameter of the sensor seal element is smaller than the outer diameter of the sensor probe 112.

The sensor seal element 116 is formed from a flexible material which is deformed when the sensor probe 112 is moved axially within it, as is shown in FIG. 2B. When the sensor probe 112 is pushed into the sensor seal element, in the direction of the arrow A, the probe 112 acts on the inner surface of the seal element 116 causing the inner diameter of the first end 126 of the sensor seal element to increase in size to accommodate the probe 112. This also causes the outer diameter of the first end 126 of the sensor seal element to radially expand, as shown by arrows B. The rifles 118 on the sensor probe 112 increase the friction between the sensor probe 112 and the seal element 116 when the probe 112 is pushed into the seal element 116 in this way, to hold the sensor probe 112 in place.

Figure 3:
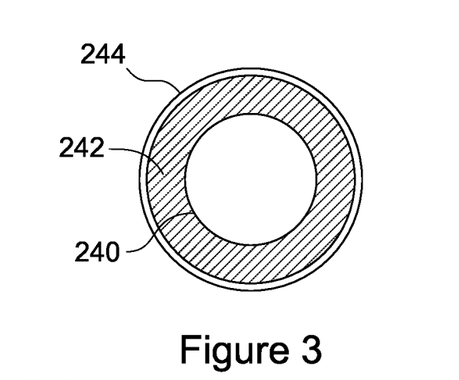
FIG. 3 is a cross-section of an insulated pipe.

FIG. 3 shows a cross-section of an insulated pipe 240. The pipe 240 is surrounded by a layer of open cell insulation 242 and a layer of weatherproof cladding 244.

Figure 4A:
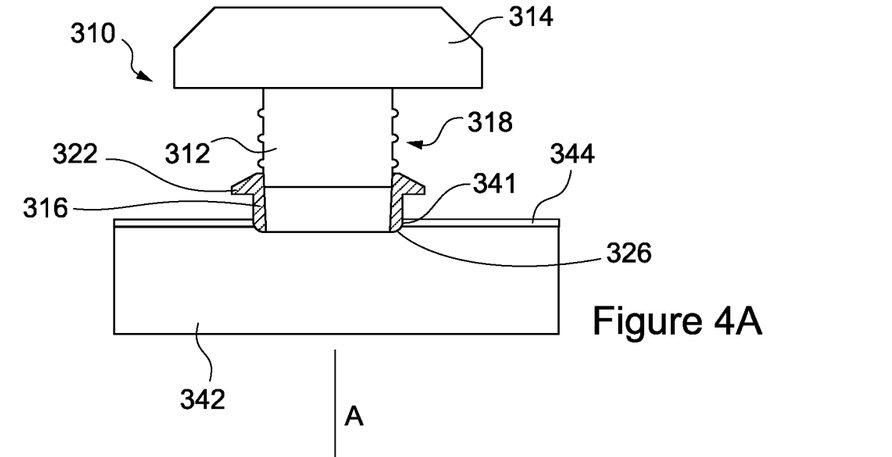
FIGS. 4A and 4B are sectional side views showing an installation sequence according to an embodiment of the invention of a sensor.
Figure 4B:
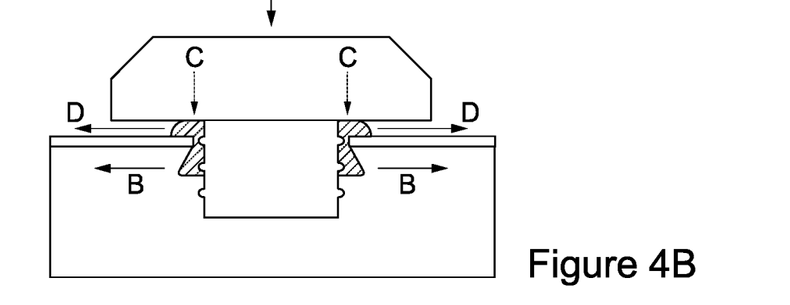

FIGS. 4A and 4B show installation of a sensor assembly 310 according to an embodiment of the invention to the insulated pipe 240 of FIG. 3. To begin with, a hole 341 is made in the cladding 344 which surrounds the insulating material 342. The diameter of the hole 341 is sized appropriately to accommodate the sensor probe. The insulating material 342 is an open cell insulation which is compressible and which will move to accommodate the sensor probe when it is inserted, without having to form a hole in the insulation 342 prior to insertion of the sensor. If, in an alternative arrangement, a closed cell or higher density insulating material is used then the installation process may also involve forming a hole in the insulating material to accommodate the sensor probe. In some cases, a hole in the insulating material may extend between the cladding and the insulated metal surface and/or between the cladding and an air void between the insulated metal surface and the insulation. In this way, when the sensor is installed the sensor probe will be in fluid communication with the environment (i.e. the air void or channel, where present) which immediately surrounds the insulated surface. As such, where water is present in an air void or channel between the insulated surface and the insulation, the probe will be in fluid communication with this void and therefore able to directly record properties relating to this environment.

When the necessary holes have been prepared, the sensor assembly 310 is located adjacent to the hole 341 in the cladding 344, with the first end 326 of the sensor seal element positioned in the opening 341 ready for insertion, as is shown in FIG. 4A.

A push-fit motion is then applied to the sensor assembly 310, as shown in FIG. 4B, to secure it to the cladding 344 surrounding the insulating material 342. To do this, a substantially axial pushing force (as shown by arrow A) is applied to the sensor assembly 310 to move the sensor probe 312 axially within the sensor seal element 316, whilst also forcing the cylindrical body portion of the sensor seal element 320 (together with the probe 312) through the hole 341 in the cladding (and potentially the insulation) and bringing the shoulder 322 of the sensor seal element into contact with an external surface of the cladding 344.

Push-fitting the sensor assembly 310 in this way causes the sensor probe 312 to act on the narrowing tapered, conical inner surface of the sensor seal element 316, causing the portion of the seal element 316 below the cladding 344 having an inner diameter less than the outer diameter of the probe 312 to radially expand in the direction of arrow B. As a portion of the sensor seal element 316 has expanded below the cladding, the sensor seal element 316 secures the sensor assembly 310 in place. Because the expended portion has an outer diameter which is greater than the diameter of the hole 341 in the cladding, it cannot move backwards through the hole 341 in its expanded state, in the absence of the application of an adequate pulling force for its removal.

The interaction between the sensor probe 312 and the first end 326 region of the sensor seal element 312 creates a force between the two components which holds them together (enhanced by the rifles 318 on the exterior of the sensor probe 312) and which inwardly pulls the sensor probe 312 towards the insulating environment (i.e. directly into the insulation or into one or more air voids beneath the cladding). Push-fitting the sensor assembly 310 in this way therefore also causes the external sensor body 314 to exert a compressive force on the shoulder portion 322 of the sensor seal element 316 sitting atop the cladding 344 (as shown by arrows C), causing it too to radially expand (as shown by arrows D). The force exerted by the external sensor body 314 upon the shoulder portion 322 of the sensor seal element 316 may also increase the stability of the attachment of the sensor assembly 310 to the cladding 344.

In addition to securing the sensor assembly 310 to the cladding 344, the seal element 316 also forms a seal with the sensor probe 312, the external sensor body 314 and the cladding 344. The fit between the sensor probe 312 and the internal surface of the seal element 316 forms a seal between the two components of the sensor. A seal is also formed between the sensor probe 312, the sensor seal element 316 and an inner surface of the hole 141 formed in the cladding 344. A further seal between the probe 312 and the seal element 316 is formed by virtue of the compressive force exerted by the external sensor body 314 on the shoulder portion 322 of the sensor seal element 316, which also forms a seal between the compressed shoulder portion 322 and the hole 341 in the cladding.

The sensor assembly 310 can therefore be installed in a manner in which it is sealingly secured to the cladding 344 by the interaction of its components—the sensor seal element 316, the sensor probe 312 and/or the external sensor body 314—effected by the application of a simple push-fit motion. Following installation, the sensor probe 312 is suitably located in the insulating environment to obtain readings as required.

The pushing force required for sensor installation is quick and easy to apply. It does not require the use of niche tools or specialist equipment and it does not require the provision of spatial clearance for the use of additional equipment around the sensor installation site. There is also a high tolerance for errors in terms of the sensor alignment during installation. The installation technique can be quickly learned and performed by the installer or installation team, without specialist training. Moreover, autonomous and semi-autonomous installation systems can be utilised. Because the installation technique of the present invention is of reduced complexity in comparison to installation methods required for prior art sensors (for example, screw fitting), it is simple for autonomous and semi-autonomous installation systems to install such sensors.

The installation method is not complex, yet it yields a secure and sealed connection between the sensor and the cladding. The formation of a seal between the sensor and the hole which is formed in the cladding is important because, if a seal were not formed, the hole could act as an entry point for water ingress to further increase the risk of CUI.

Another advantage of the self-sealing sensor is that the sensor is retrievable, meaning that it can be removed from the hole in the cladding, if and when this is required, leaving the sensor and the cladding intact. To retrieve the sensor, a pulling force is applied to the external sensor body in the opposite direction to the push-fit force which was required for installation. A twisting force may also be applied to rotate the sensor probe with respect to the seal element and/or the hole, in particular where the sensor probe and/or the inner surface of the seal element comprises rifles. This is useful if the sensor develops a fault and requires repair or replacement, or for routine sensor maintenance to be conducted.

The cladding which surrounds the insulation can be formed from various materials. As such, the pushing and/or pulling force required to install and/or retrieve the sensor, respectively, can be tailored depending on the yield strength of the cladding material. For example, it would be desirable to apply a pushing force of lower magnitude to insulation surrounded by aluminium cladding than it would be to insulation surrounded by steel insulation. Beneficially, the sensor of the present invention can be installed in various cladding materials using the self-sealing, push-fit method. In contrast, prior art installation methods—which include directly screwing sensors to cladding—can be difficult to achieve with a variety of different cladding materials.

It will be appreciated that although the external surface of the sensor probe is described as comprising rifles, these may be omitted in some embodiments of the invention or replaced in part, or entirely, by something different. For example, the outer surface of the probe and/or the inner surface of the sensor seal element may be provided with an alternative means for increasing the friction between the two surfaces upon installation (i.e. a textured surface or surfaces). Alternatively, the probe and the inner surface of the seal element may be provided with cooperating screw threads.

It will also be appreciated that, although the sensor seal element is described as having a tapered, conical inner profile, in alternative embodiments of the invention alternative configurations for reducing some of all of the inner diameter of the seal element (i.e. to similarly effect radial expansion when the sensor probe is fully inserted) may be provided.

Figure 5:
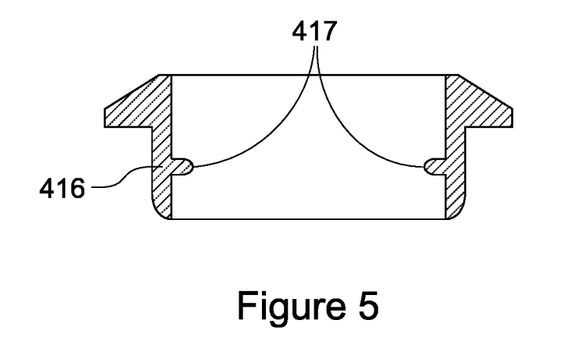
FIG. 5 is a sectional side view of a sensor seal element according to an embodiment of the invention.

FIG. 5 shows an alternatively configured sensor seal element 416 according to an alternative embodiment of the invention. In this embodiment, the seal element 416 has a cylindrical inner surface with a substantially uniform diameter which comprises an internal annular groove 417 forming a reduced diameter portion within the inner bore.

Figure 6:
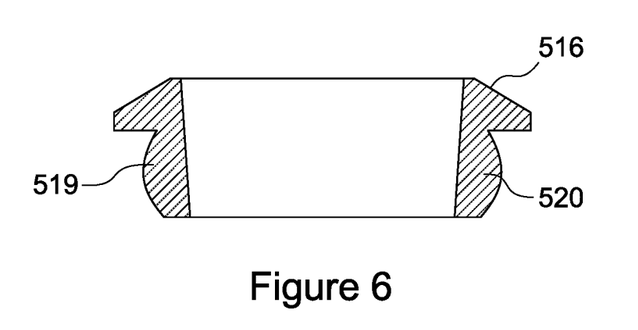
FIG. 6 is a sectional side view of a sensor seal element according to an embodiment of the invention.

A further alternatively configured sensor seal element 516 is shown in FIG. 6. Like the seal element 316 of FIGS. 4A and 4B, this sensor seal element 516 has a tapered, conical inner profile. The seal element 516 differs from the seal element 516 in that its outer profile is curved 519. At its widest point, the outer diameter of the body portion 520 of the seal element 516 is configured to be wider than a hole formed in the cladding. However, given the flexible nature of the material from which the seal element is formed, the pushing force applied to install the sensor forces the curved portion 519 through the hole. This type of sensor seal element 516 creates a greater radial expansion under the cladding when a sensor probe is pushed into it.

Figure 7A:
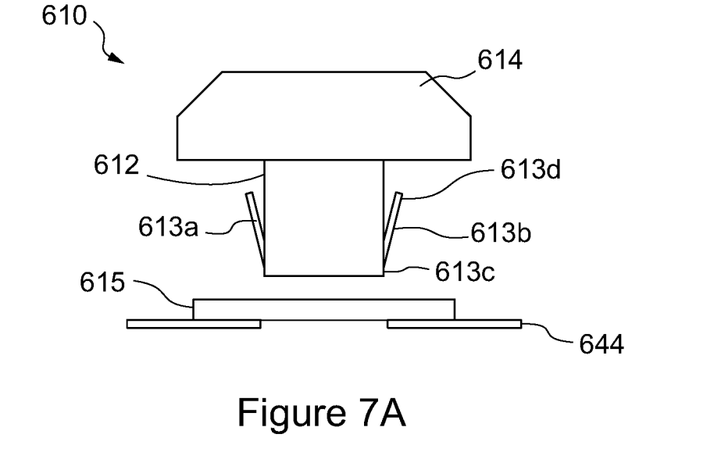
FIG. 7A is a part-sectional side view of a sensor according to an embodiment of the invention.
Figure 7B:
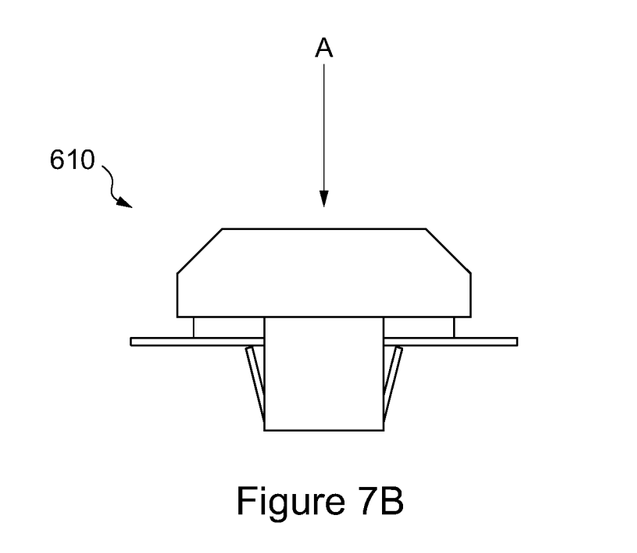
FIG. 7B is a part-sectional side view of the sensor of FIG. 7A in an installed position.

FIGS. 7A and 7B show, generally at 610, an alternative sensor for detecting the presence of water in an insulating material which can be utilised in the method described with reference to FIG. 1. FIG. 7A shows the sensor before installation and FIG. 7B shows the sensor following installation. Like the sensor assembly 110 shown in FIGS. 2A and 2B, the sensor 610 is also installed using a pushing force. As such, the sensor 610 is simple and quick to install and no complicated movements (like screwing) are required for installation of the sensor 610. For these reasons, autonomous and semi-autonomous installation systems are particularly suited for installation of the sensor.

The sensor 610 comprises a sensor probe 612 rigidly coupled to an external sensor body 614. The sensor probe 612 and external body 614 are similar to the sensor probe 112 and external sensor body 114 of the sensor assembly 110 of FIGS. 2A and 2B and will be understood from the accompanying description. The sensor 610 differs from the sensor 110 in that, instead of a sensor seal element, the sensor 610 comprises two snap-fit elements 613a and 613b mounted opposite one another on the sensor probe 612. The probe 612 and the elements 613a and 613b are not configured to move axially with respect to one another. The elements 613a and 613b are tapered: at their first ends 613c they are separated by a distance which is sized to fit through a hole formed in the cladding 644 in which the sensor 610 is going to be installed and at their second ends 613d they are separated by a distance which is greater than the diameter of the hole. The elements 613a and 613b are formed from a springy, resilient material.

It will be appreciated that although two snap-fit elements are described, any number of snap-fit elements, in any appropriate configuration with respect to the sensor may be provided. For example, three snap fit elements could be placed around the circumference of the probe, and may or may not be evenly spaced. Alternatively, a snap-fit ring which surrounds the probe could be provided.

To install the sensor, a gasket 615 is positioned on an external surface of the cladding 644, surrounding a hole in the cladding 644. The sensor 610 is located at the hole and a pushing force is applied to the sensor to move the sensor probe 612 through the hole, in the direction shown by arrow A in FIG. 7B. As the sensor probe 612 is pushed through the hole, a second end region 613*d* of the resilient snap fit elements 613*a* and 613*b* is forced to decrease in diameter, allowing the entire elements 613*a* and 613*b* to also be passed through the hole. After the elements 613*a* and 613*b* have passed through the hole in the cladding 644, the second ends 613*d* of the elements 613*a* and 613*b* spring out to their original shape, to secure the sensor 610 in place in the hole. The external sensor body 614 exerts a compressive force on the gasket 615, to form a seal with the cladding 644.

Figure 8:
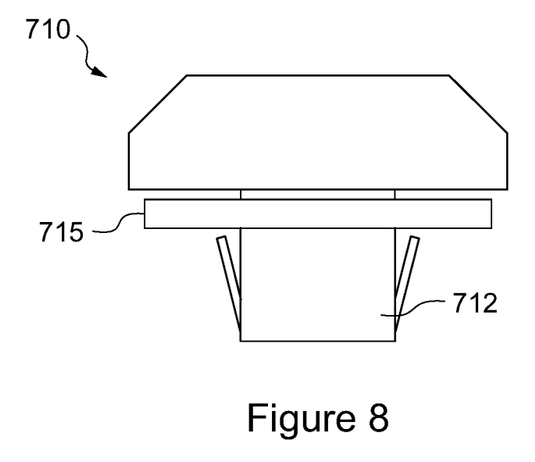
FIG. 8 is a part-sectional side view of a sensor according to an embodiment of the invention.

Alternatively, as shown in FIG. 8, a sensor 710 can have a gasket 715 pre-assembled around the sensor probe 712, before it is installed. In this way, the step of separately positioning the gasket on the cladding is negated.

Although the foregoing description relates to sensors for detecting the presence of water in an insulating material surrounding plant equipment and/or pipe work, the inventive concept equally applies to sensors for detecting or monitoring different properties. For example, the sensors could be configured to detect temperature or salinity, amongst other properties.

An aspect of the invention provides a method of installing a sensor system in insulating material surrounding plant equipment and/or pipe work in a facility. The method comprises selecting a section of insulated plant equipment and/or pipework of the facility. The method further comprises installing a plurality of sensors in insulating material surrounding the plant equipment and/or pipe work in the section according to an installation plan, wherein installing the plurality of sensors comprises using an electronic apparatus, transmitting and/or receiving at least one unique identifier to and/or from each sensor of the plurality of sensors and recording at least one installation property of each of the plurality of sensors using the unique identifier. The method comprises defining a group of installed sensors using the transmitted and/or received unique identifiers, and associating the group of installed sensors with the section of insulated plant equipment and/or pipework.

An aspect of the invention provides a method for installing a sensor in an insulating material surrounding plant equipment and/or pipe work. The method comprises providing a sensor assembly for detecting the presence of water in an insulating material, the sensor assembly comprising a sensor probe and a sensor seal element arranged around the sensor probe. The method also comprises locating an end of the sensor assembly with respect to a hole formed in cladding surrounding the insulating material. The method further comprises applying a pushing force to the sensor assembly to push the sensor probe and a portion of the sensor seal element into the hole, causing the sensor probe to be moved with respect to the sensor seal element into an engaged position with the sensor seal element, and causing the sensor seal element to deform and form a seal with the hole.

Various modifications may be made within the scope of the invention as herein intended, and embodiments of the invention may include combinations of features other than those expressly described herein.

The invention claimed is:

1. A method of installing a sensor system in insulating material surrounding plant equipment and/or pipe work in a facility, the method comprising:
   selecting a section of insulated plant equipment and/or pipework of the facility; and
   installing a plurality of sensors in insulating material surrounding the plant equipment and/or pipe work in the section according to an installation plan;
   wherein installing the plurality of sensors comprises:
      using an electronic apparatus, transmitting and/or receiving at least one unique identifier to and/or from each sensor of the plurality of sensors during installation of said sensor and recording at least one installation property of each of the plurality of sensors using the unique identifiers;
      defining a group of installed sensors using the transmitted and/or received unique identifiers, and associating the group of installed sensors with the section of insulated plant equipment and/or pipework; and
      storing and/or outputting installation data comprising the unique identifiers, the at least one installation property, and the installation plan,
      wherein the at least one installation property is an installation sequence of the plurality of sensors using the unique identifiers.

2. The method according to claim 1, comprising using the installation data to derive location information for an individual sensor of the group of sensors.

3. The method according to claim 1, comprising deriving location information for multiple sensors of the group of sensors from the installation data.

4. The method according to claim 1, comprising deriving a map of sensor locations for some or all of the sensors of the group of sensors.

5. The method according to claim 1, wherein the method comprises defining the installation plan.

6. The method according to claim 1, wherein the installation plan is a pre-determined installation plan.

7. The method according to claim 1, wherein the installation plan comprises one or more rules or criteria.

8. The method according to claim 5, wherein the installation plan is based on one or more characteristics of the section of insulated plant equipment and/or pipework selected from the group comprising: the CUI risk factor for the section; the physical layout of the section; the presence and location of equipment and/or pipework components in the section; the location of the section with respect to the wider facility; ease of access of the section; and/or properties of the plant equipment and/or pipework over which the section spans.

9. The method according to claim 5, wherein the installation plan comprises a rule to install each of the plurality of sensors at predetermined distance intervals.

10. The method according to claim 9, wherein the predetermined distance intervals are defined between two reference points.

11. The method according to claim 1, wherein the unique identifier is optically readable.

12. The method according to claim 1, wherein the unique identifier is a readable and/or writeable RFID tag.

13. The method according to claim 1, wherein each sensor of the plurality of sensors is configured to be activated, wherein, upon activation of each sensor of the plurality of sensors, the sensor is allowed to transmit and/or receive at least one unique identifier to and/or from the electronic apparatus, wherein each sensor of the plurality of sensors is configured for:

manual activation by a button or switch;
electronic activation;
inductive activation;
magnetic activation;
touch-activation;
activation by sound, light, a temperature pattern, or combination thereof;
activation by a change in temperature or humidity;
activation by a temperature or humidity threshold; or
activation in response to a signal.

14. The method according to claim 1, comprising installing each sensor of the plurality of sensors by applying a pushing force to the sensor to push a sensor probe of the sensor into a hole in cladding surrounding the insulating material.

15. The method according to claim 14, wherein the application of the pushing force to the sensor causes a seal to be formed between the sensor and the hole.

16. The method according to claim 14, wherein the application of the pushing force to the sensor causes the sensor to be secured to the cladding.

17. The method according to claim 1, wherein one or more sensors of the plurality of sensors comprises a sensor probe and a sensor seal element arranged around the sensor probe.

18. The method according to claim 1, wherein one or more sensors of the plurality of sensors comprises a fastening element.

* * * * *